United States Patent Office 3,686,069
Patented Aug. 22, 1972

3,686,069
COMPOSITE ARTICLES OF POLYETHYLENE TEREPHTHALATE AND POLYAMIDE AND METHODS FOR MAKING SAME
Ernel R. Winkler, Corning, N.Y. (R.D. 1, Elmira, N.Y. 14903), and Im K. Park, 1 Ashwood Court, Summit, N.J. 07901
No Drawing. Continuation-in-part of abandoned application Ser. No. 683,791, Nov. 17, 1967. This application Nov. 5, 1970, Ser. No. 87,343
Int. Cl. B32b 27/08, 27/34, 27/36
U.S. Cl. 161—227
5 Claims

ABSTRACT OF THE DISCLOSURE

Composite articles of polyethylene terephthalate and polyamide, such as multilayered films, tubes, and the like, are provided by interposing a powdered mixture of the two polymers between the parts to be joined, and fusing the resulting composite body.

This is a continuation-in-part of application Ser. No. 683,791, filed Nov. 17, 1967, now abandoned.

BACKGROUND OF INVENTION

The present invention relates to composite articles and methods of making the same, and relates more particularly to a composite article of polyethylene terephthalate bonded to a polyamide and to a novel method for adhering or bonding the polymers to each other.

In the production of synthetic plastic articles, such as films, tubes, molded articles and fabrics, a portion of the article may, for some desired purpose, be made of one kind of plastic, with two portions firmly bonded or adhered to each other.

Crystalline fiber and sheet forming polymers such as polyethylene terephthalate and the polyamides, tend to discriminate against each other, thereby making it difficult to adhere or bond polyethylene terephthalate to polyamide due to their incompatibility. In some instances they do not adhere at all, while in other instances the bond between them is too weak for many useful purposes.

Although the polyamides and polyethylene terephthalate each have their own distinctive and desirable properties, neither used singularly is satisfactory for many applications. By combining a polyamide with polyethylene terephthalate a variety of properties can be obtained. For instance, layers of a film can be chosen to provide particularly desirable overall film properties, such as using polyethylene terephthalate as one layer of the film to provide improved water impermeability and greater light stability, for it is not generally as severely degraded by light as polyamide, and making another layer of polyamide, and making another layer of polyamide for better dyeability and adhesive properties. In addition, due to the relatively high mechanical strength of polyethylene terephthalate, the overall or composite film will be stronger than a film of polyamide alone.

SUMMARY OF THE INVENTION

Accordingly, an object of this invention is to provide a composite article, body, film, tube or the like of polyethylene terephthalate and polyamide which has high strength for adherence between the respective polymers, and methods for making the same.

Other objects of this invention will be apparent from the following more detailed description.

In accordance with the present invention, the composite article is formed by fusing polyethylene terephthalate to a polyamide with an interposed physical mixture or chemically heterogeneous blend of polyethylene terephthalate and polyamide. The mixture acts as a transition zone between the two polymers, yielding a micro-mechanical interlock which serves to give maximum strength and adherence between them.

Polyethylene terephthalate is a well known fiber and film forming saturated polyester of great commercial importance. It is usually made by:

(i) esterification (methylation) of terephthalic acid,
(ii) ester interchange between the resultant dimethyl-terephthalate and excess glycol, yielding a mixture of bis (beta-hydroxyethyl) terephthalate and low molecular weight polymers having terminal beta-hydroxyethyl ester groups, and
(iii) heating the condensate under vacuum to effect removal of glycol in order to form a high molecular weight product.

In general, polyethylene terephthalate is amorphous as it comes from the reactor, and retains its amorphous form upon rapid cooling. Crystallization occurs upon reheating, however, and the polymer then usually loses its transparent glassy appearance, turning opaque and white or pale cream in color. The crystalline polymer is a tough white opaque solid which has a normal equilibrium melting point of about 265° C. It is insoluble in most organic solvents.

For purposes herein, the term "normal equilibrium melting point" or simply "melting point" means that temperature at which the solid and liquid phases of the material are at equilibrium at atmospheric pressure.

Polyamides which may be used in the present invention are long chain synthetic polymeric amides which have recurring amide groups as an integral part of the main polymer chain, and which recurring intralinear carbonamide groups in the polyamides are separated by at least two carbon atoms, and which polyamides are capable of being formed into a filament in which the structural elements are oriented in the axial direction. The polyamides useful in the present invention may be made by any of the well known processes. For example, polyamides can be made by the polymerization of amino acids such as omega-amino undecanoic acid, by the polycondensation of lactams such as caprolactam, or by condensation of various dicarboxylic acids such as adipic and sebacic acids with diamines such as hexamethylene and octamethylene diamines.

Preferably, the polyamide used herein is made from hexamethylene diamine and adipic acid. This polyamide is commonly referred to as nylon 66 or the 66 polymer because each of the two reactants contain six carbon atoms. Also suitable is the 610 polymer made from hexamethylene diamine and sebacic acid, the 6 polymer which is made from epsilon-caprolactam, and the 11 polymer, which is obtained from omega-amino undecanoic acid.

The 66 type is especially preferred because its equilibrium melting point is about the same as that of polyethylene terephthalate, which, as hereinafter more fully explained, is advantageous in the practice of the present invention.

Representative polyamides which may be used herein and their method of production are set forth in U.S. Pats. 2,071,250–3 and 2,130,948 and the "Collected Papers of Wallace Hume Carothers on High Polymeric Substances," Interscience Publishers, Incorporated, New York, 1940.

In practicing the present invention, a uniform blend of polyethylene terephthalate and polyamide particles is interposed between the polymer layers which are to be bonded together, and the resulting composite body is heated to fuse the layers together. As hereinafter more fully explained, the polyethylene terephthalate and polyamide may be mixed, preferably in the form of a powder, in any convenient manner to form the interface or bonding layer. This promiscuous commingling of the two polymers prevents or substantially retards segregation of the polymers in the "transition zone." Upon cooling, the polymers of the composite body tend to crystallize, resulting in two discrete phases within this zone.

DESCRIPTION OF PREFERRED EMBODIMENTS

While the present invention is applicable to the production of composite articles of polyethylene terephthalate and any of the various kinds of polyamides, it is particularly applicable to the production of bonds between polyethylene terephthalate and a polyamide having substantially the same melting point, such as the 66 polyamide.

When using a combination of polyethylene terephthalate and a polyamide of substantially the same melting point, neither polymer will necessarily have to be heated significantly beyond its melting point. This is desirable for, in general, these polymers tend to react and/or degrade upon excessive heating, and therefore, this heating should be minimized as much as possible.

Further, by using a polyamide of substantially the same melting point as polyethylene terephthalate, methods of handling the polymers during the bonding or fusion process are simplified. That is, the polymers will usually be of sufficient viscosity so as not to readily run or drip.

The interposed mixture is usually prepared from the same polymers which are to be bonded, although the polyamide constituent in the mixture can differ from the polyamide which is to be bonded to the polyethylene terephthalate. If desired, several different polyamides may be used in the interposed mixture or blend.

The bonding layer generally comprises a mixture of polyamide and polyethylene terephthalate polymers, preferably in the range of about 20 to 80 parts by weight polyamide with about 80 to 20 parts polyethylene terephthalate, and most preferably about 50 parts by weight of each.

In most instances a single relatively homogeneous mixture is adequate, but it is within the scope of the invention to use two or more regions of graded proportions. For example, one can have, in the following order a body of polyamide, an adjacent mixture with a high portion of polyamide to polyethylene terephthalate, a next adjacent mixture with a lower proportion of polyamide to polyethylene terephthalate, and, finally, the body of polyethylene terephthalate. The interposed mixture may also include, if desired, other ingredients such as fillers, stabilizers, pigments, and plasticizers.

Other prior art mentions "blends" of polyesters and polyamides. For example, Australian Pat. 132,546 refers to the combining of polyesters with other polymeric materials by heating in the melt until a "homogeneous blend" is obtained. U.S. Pat. 3,493,544 by Goodman et al. and U.S. Pat. 2,765,251 by Williams et al. describe polyesteramide copolymer and copolyester adhesives. Obviously, however, when blends of polyesters and copolyamides are prepared in accordance with the teachings of such prior art, a chemical interaction occurs between the two polymers to produce a new and entirely different polymeric species as is evident from the homogeneity and single melting points of the so-called "blends" and "adhesives."

The physical mixtures prepared in accordance with our invention are chemically heterogeneous blends consisting of at least two discrete phases, one dispersed in the other with no chemical interaction between them, as distinguished from the homogeneous blends of the prior art. This is readily apparent when, for example, the "transition zone" is examined by means of a polarizing microscope. The discrete phases can be readily identified by other microscopic techniques such as Leitz phase contact and election microscopy. The existence of discrete phases may also be shown by differential thermal analysis (DTA) which indicates that the melting points of the polyester and polyamide phases remain substantially unchanged.

The interposed mixture of this invention is prepared by admixing the ingredients thereof in any suitable or convenient manner to obtain a substantially chemically heterogeneous, powdered composition. A suitable method of admixing the components of the composition is to blend the components while they are being kneaded, e.g., on heated rolls or during passage through a screw type or another type of mixer-extruder apparatus, and then pulverizing or otherwise comminuting the resulting mixture to power form. Alternatively, when both of the components are already in the form of finely divided solids, they can be blended in any conventional blending or mixing apparatus until a thoroughly mixed powder results.

The particle size of the polymers in the resulting mixture may vary over a wide range, but preferably the average particle size is under about several hundred microns, e.g., an average particle size of about 50 to 300 microns.

The main criterium regarding the particle size of the polymers in the transition zone is that it be sufficiently small i.e. less than about ⅕ the thickness of the transition zone to insure an effective mechanical bonding.

An important feature of this invention is the time of heating and/or of blending at temperatures above the melting points of the polymer ingredients. The time of heating and/or blending at temperatures above the respective melting points should usually not exceed one hour. In the case of certain polyester-polyamide combinations, it is possible to heat and/or blend for longer times at temperatures above the melting points, if it is so desired; however, since it is not entirely predictable which combinations can be kept above the melting points for long periods without realizing chemical reactions, it is best to limit this time to a maximum of one hour in every instance.

To reiterate: it is necessary to minimize the length of time that the transition blends are maintained in the molten state either during melt blending operations such as in a compounding extruder or during composite fusing. It has been found that by removing all traces of moisture from the polymeric ingredients, it is possible to maintain the blends in the molten state at temperatures reasonably in excess of 250° C. for periods of up to one hour without any degradation or detectable chemical interaction between the two ingredients.

As a result, the zone thus formed is completely heterogenous, having a distinct polyamide phase dispersed in a polyester phase. Preferably the blends are maintained in a molten state for periods no longer than 30 minutes.

After interposing the mixture or blend between the bodies to be bonded, the composite article or body is heated to melt the polyethylene terephthalate and polyamide respectively. The composite body must be heated to at least the melting point of the higher melting polymer used for a period of time sufficient to allow enough of the higher melting polymer to melt so as to introduce sufficient fluidity to the polymer components. When using polyethylene terephthalate and 66 polyamide, the composite body is heated to a temperature in the range of about 265° C. to about 320° C., and preferably to a temperature of about 270° C. to 300° C., for about 5 seconds to about one minute. The heating time varies depending upon the particle size of the polymers in the mixture and the depth of the interposed mixture or layer. Large particle sizes and greater depths require longer heating time.

The thickness of the interposed layer or mixture will obviously depend on the size and weight of the polyamide and polyethylene terephthalate particles, and, in general, the larger the size, the greater the necessary thickness of the transition zone.

The resulting fused composite article is then cooled, either quickly as by water quench, or slowly as by letting the composite article cool naturally at room temperature.

While the above described bonding process can be carried out in air, it is preferably carried out in an atmosphere of an inert gas such as nitrogen or argon and the like in order to prevent the polymers from degrading such as by oxidation.

The above heating or fusing step is conveniently conducted at atmospheric pressure although sub-atmospheric or super-atmospheric pressures can be used if desired.

The invention is additionally illustrated by the following examples.

EXAMPLE I

A satisfactory interposition mixture according to the present invention was made by extruding a 50 percent by weight mixture of polyethylene terephthalate chips (the polyethylene terephthalate had an inherent viscosity of .6 to .7 in an 8% by weight and volume solution of orthochlorophenol at room temperature and was manufactured by Fiber Industries, Inc.) and 66 polymer pellets (sold under the trademark Zytel by E. I. du Pont de Nemours & Co.) three times under nitrogen and then pulverizing to powder form. Within the extruder the mixture was exposed to a maximum temperature of approximately 270° C. for a period of time from about 5 seconds to about a minute and a half. A portion of the powdered mixture was then interposed between a film of polyethylene terephthalate and a film of 66 polyamide. The sandwich was then heated to 315° C. on a microscope hot stage and held there for about 10 seconds. The composite film was quenched in water. The films adhered to each other and could not be separated.

To secure even better adherence in some cases, a hot press can be used instead of a hot stage to provide direct pressure on the sandwich.

EXAMPLE II

Polyethylene terephthalate chips and Zytel polymer pellets as identified in Example I were pulverized individually to an average particle diameter size of 200 microns. A mixture composed of 80 percent by weight of the polyethylene powder and 20 percent by weight of the polyamide powder was then interposed between the films of Example I. The structure was then fused between heated platens for 10 seconds at 1,000 p.s.i. at from about 300° C. to about 320° C. The composite was quenched in water. The films adhered to each other and could not be separated.

An attempt was made to adhere polyethylene terephthalate film to 66 polyamide under the same conditions as described in both of the above examples but without using the interposed mixture of the two. After cooling, the polyamide film could be readily and easily separated from the polyethylene terephthalate film by simply peeling the polyethylene terephthalate film from the polyamide film by hand.

The principles, preferred embodiments and modes of operation of the present invention have been described in the foregoing specification. The invention which is intended to be protected herein, however, may be practiced otherwise than as described without departing from the scope of the appended claims.

What is claimed is:

1. A composite article comprising a shaped article of polyethylene terephthalate bonded to a shaped article of polyamide by an interposed heterogeneous mixture consisting essentially of polyethylene terephthalate and polyamide wherein said mixture comprises about 20 to 80 parts of polyethylene terephthalate with about 80 to 20 parts of polyamide.

2. The composite article of claim 1 comprising a film of polyethylene terephthalate bonded face to face to a film of polyamide with an interposed layer of said heterogeneous mixture of polyethylene terephthalate and polyamide.

3. The composite article of claim 2 wherein said heterogeneous mixture comprises 50 parts polyethylene terephthalate with about 50 parts polyamide.

4. A method for producing a composite article of polyethylene terephthalate and polyamide comprising interposing between shaped articles of said polymers a heterogeneous mixture consisting essentially of polyethylene terephthalate and polyamide, wherein said mixture comprises about 20 to 80 parts of polyethylene terephthalate, heating said composite to a temperature sufficient to melt said heterogeneous mixture into two discrete phases, and cooling the composite article.

5. The method of claim 4 wherein the shaped article of polyamide to be bonded and the polyamide in said interposed heterogeneous mixture are the same; and wherein said mixture to be interposed is in powder form, with a 50 weight percent composition and said composite body is heated to a temperature of about 265° C. to about 315° C. from about 1 second to about 1 minute in an inert atmosphere.

References Cited

UNITED STATES PATENTS

| 3,454,446 | 7/1969 | Sakuragi et al. | 156—310 |
| 2,765,251 | 10/1956 | Williams | 161—227 |
| 3,492,368 | 1/1970 | Coover et al. | 260—857 |
| 3,378,602 | 4/1968 | Robertson | 260—857 PE |
| 3,493,544 | 2/1970 | Goodman et al. | 161—227 |
| 3,369,057 | 2/1968 | Twilley | 260—857 PE |

ROBERT F. BURNETT, Primary Examiner

G. W. MOXON II, Assistant Examiner

U.S. Cl. X.R.

156—283, 309, 331, 332; 161—231; 260—857 PE